US009257249B2

(12) United States Patent
Inagaki et al.

(10) Patent No.: US 9,257,249 B2
(45) Date of Patent: Feb. 9, 2016

(54) POWER SUPPLY CONTROL DEVICE (71) Applicant: Panasonic Corporation, Kadoma-shi, Osaka (JP)

(72) Inventors: Noboru Inagaki, Mie (JP); Tatsuya Mukai, Mie (JP); Naoki Fukuo, Mie (JP); Shinichi Nakamura, Mie (JP); Takao Akioka, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 124 days.

(21) Appl. No.: 14/160,885

(22) Filed: Jan. 22, 2014

(65) Prior Publication Data
US 2014/0292272 A1 Oct. 2, 2014

(30) Foreign Application Priority Data

Mar. 28, 2013 (JP) ................................. 2013-069915

(51) Int. Cl.
*H02J 7/00* (2006.01)
*H01H 47/22* (2006.01)
*B60L 3/00* (2006.01)
(Continued)

(52) U.S. Cl.
CPC .............. *H01H 47/22* (2013.01); *B60L 3/0069* (2013.01); *B60L 3/04* (2013.01); *B60L 11/1818* (2013.01); *B60L 11/1846* (2013.01); *H02J 7/0052* (2013.01); *B60L 2230/12* (2013.01); *B60L 2230/16* (2013.01); *B60L 2240/36* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01)

(58) Field of Classification Search
CPC ...................................................... H02J 7/0027
USPC .......................................................... 320/109
See application file for complete search history.

(56) References Cited

U.S. PATENT DOCUMENTS

| 3,991,356 A | 11/1976 | Spiteri |
| 8,421,404 B2 | 4/2013 | Nakamura et al. |
| 8,660,732 B2 * | 2/2014 | Masuda ........................ 701/22 |

(Continued)

FOREIGN PATENT DOCUMENTS

| JP | H11-7878 A1 | 1/1999 |
| JP | 2009-240053 A | 10/2009 |

(Continued)

OTHER PUBLICATIONS

A copy of European search report issued on Nov. 9, 2015 in the counterpart European patent application.

*Primary Examiner* — Suchin Parihar
(74) *Attorney, Agent, or Firm* — Marvin A. Motsenbocker; Mots Law, PLLC (57) ABSTRACT The power supply control device in accordance with the present invention includes: a power reception terminal for receiving power; a power supply terminal for supplying power; a relay configured to make and break an electrical connection between the power reception terminal and the power supply terminal; a control circuit configured to control the relay; a power supply circuit configured to supply power to the control circuit by use of power received via the power reception terminal; and a printed wiring board. The control circuit and the power supply circuit are mounted on the printed wiring board.

8 Claims, 10 Drawing Sheets (51) Int. Cl.
   *B60L 3/04*         (2006.01)
   *B60L 11/18*        (2006.01)

(56) References Cited

U.S. PATENT DOCUMENTS

| | | |
|---|---|---|
| 2006/0237226 A1 | 10/2006 | Gotou et al. |
| 2011/0025259 A1* | 2/2011 | Toya et al. ................... 320/107 |
| 2011/0029144 A1* | 2/2011 | Muller et al. ................ 700/293 |
| 2011/0148355 A1 | 6/2011 | Nakamura et al. |
| 2011/0204715 A1 | 8/2011 | Nakamura et al. |
| 2011/0258112 A1* | 10/2011 | Eder et al. ..................... 705/39 |
| 2012/0013178 A1 | 1/2012 | Lim |
| 2013/0322017 A1* | 12/2013 | Muller et al. ................. 361/690 |
| 2014/0015494 A1* | 1/2014 | Kobayashi et al. ........... 320/137 |
| 2014/0062419 A1* | 3/2014 | Kasaya et al. ................ 320/160 |
| 2014/0125123 A1 | 5/2014 | Park |
| 2014/0191720 A1* | 7/2014 | Sugiyama et al. ............ 320/109 |
| 2014/0292272 A1* | 10/2014 | Inagaki et al. ................ 320/109 |
| 2014/0292273 A1* | 10/2014 | Inagaki et al. ................ 320/109 |
| 2015/0035486 A1* | 2/2015 | Yamaguchi ................... 320/109 |

FOREIGN PATENT DOCUMENTS

| | | |
|---|---|---|
| JP | 2011-135653 A | 7/2011 |
| WO | 2013009011 A1 | 1/2013 |

* cited by examiner

POWER SUPPLY CONTROL DEVICE

TECHNICAL FIELD

The present invention relates to power supply control devices.

BACKGROUND ART

In the past, there have been provided power supply control devices that control power supply from external power sources to automobiles. The external power source is, for example, a commercial 100V AC power supply. The automobile includes a battery and a charging circuit for charging the battery, is capable of running on a motor that is driven by electrical power from the battery, and specifically is a plug-in hybrid vehicle or an electric vehicle. The power supply control device is used for supplying electrical power to the charging circuit.

A power supply control device of this kind includes a relay inserted in a power supply path from the external power source to a load (charging circuit), a control circuit that controls turning on/off of the relay, and a power circuit for generating power for the control circuit. The control circuit controls the relay to be turned off, according to a signal input from the outside or when an abnormality such as an electric leakage is detected, for example.

Conventionally, the control circuit and the power circuit are mounted on different printed wiring boards (see document 1 [JP 2011-135653 A]).

However, in the case where the control circuit and the power circuit are mounted on the different printed wiring boards, as described above, it is necessary to provide conductors (such as pins or electric cables) connecting the printed wiring board on which the control circuit is mounted to the printed wiring board on which the power circuit is mounted. When such conductors are provided, there is a possibility that poor or bad connection with the printed wiring boards will occur at both ends of the conductors, and thus the possibility of such poor connection occurring as a whole is relatively high.

SUMMARY OF INVENTION

The present invention has been made in view of the above-described problems, and an object of the present invention is to provide a power supply control device in which poor connection is not likely to occur.

The power supply control device of the first aspect in accordance with the present invention includes: a power reception terminal for receiving power; a power supply terminal for supplying power; a relay configured to make and break an electrical connection between the power reception terminal and the power supply terminal; a control circuit configured to control the relay; a power supply circuit configured to supply power to the control circuit by use of power received via the power reception terminal; and a printed wiring board. The control circuit and the power supply circuit are mounted on the printed wiring board.

According to the power supply control device of the second aspect in accordance with the present invention, in addition to the first aspect, the power supply control device further includes an electrical circuit and a block. The electrical circuit is electrically connecting the power reception terminal and the power supply terminal. The block holds the power reception terminal, the power supply terminal, the relay, the printed wiring board, and the electrical circuit. The relay is configured to make and break the electrical connection between the power reception terminal and the power supply terminal by opening and closing the electrical circuit. The block has a first end and a second end respectively defining opposite ends in a first direction, and a third end and a fourth end respectively defining opposite ends in a second direction perpendicular to the first direction. The power reception terminal and the power supply terminal are positioned at the first end and the second end, respectively. The electrical circuit is positioned closer to the third end than the fourth end such that a circuit accommodating space is formed closer to the third end than the fourth end. The control circuit and the power supply circuit are positioned in the circuit accommodating space.

According to the power supply control device of the third aspect in accordance with the present invention, in addition to the second aspect, the block has a fifth end and a sixth end respectively defining opposite ends in a third direction perpendicular to each of the first direction and the second direction. The printed wiring board has a mounting surface on which the control circuit and the power supply circuit are mounted. The printed wiring board is positioned closer to the sixth end than the fifth end such that the mounting surface faces the fifth end.

According to the power supply control device of the fourth aspect in accordance with the present invention, in addition to the third aspect, the block includes a relay accommodating space in which the relay is positioned. The relay accommodating space is positioned closer to the fourth end than the third end.

According to the power supply control device of the fifth aspect in accordance with the present invention, in addition to the fourth aspect, the block includes a supporting member supporting the relay. The supporting member is positioned closer to the sixth end than the fifth end and defines a bottom of the relay accommodating space. At least one part of the electrical circuit is embedded in the supporting member.

According to the power supply control device of the sixth aspect in accordance with the present invention, in addition to the fourth or fifth aspect, the block includes a partition. The partition is interposed between the circuit accommodating space and the relay accommodating space.

According to the power supply control device of the seventh aspect in accordance with the present invention, in addition to the sixth aspect, the block includes a first side wall defining the first end, a second side wall defining the second end, a third side wall defining the third end, and a fourth side wall defining the fourth end. The circuit accommodating space is defined as a space enclosing by the first side wall, the second side wall, the third side wall, and the partition. The relay accommodating space is defined as a space enclosing by the first side wall, the second side wall, the fourth side wall, and the partition.

According to the power supply control device of the eighth aspect in accordance with the present invention, in addition to any one of the first to seventh aspects, the power reception terminal and the power supply terminal are positioned on a straight line extending in the first direction.

According to the power supply control device of the ninth aspect in accordance with the present invention, in addition to any one of the first to eighth aspects, the power reception terminal is to be electrically connected to an external power source. The power supply terminal is to be electrically connected to a charging circuit for charging a battery of an automobile.

DESCRIPTION OF EMBODIMENTS

Figure 1:
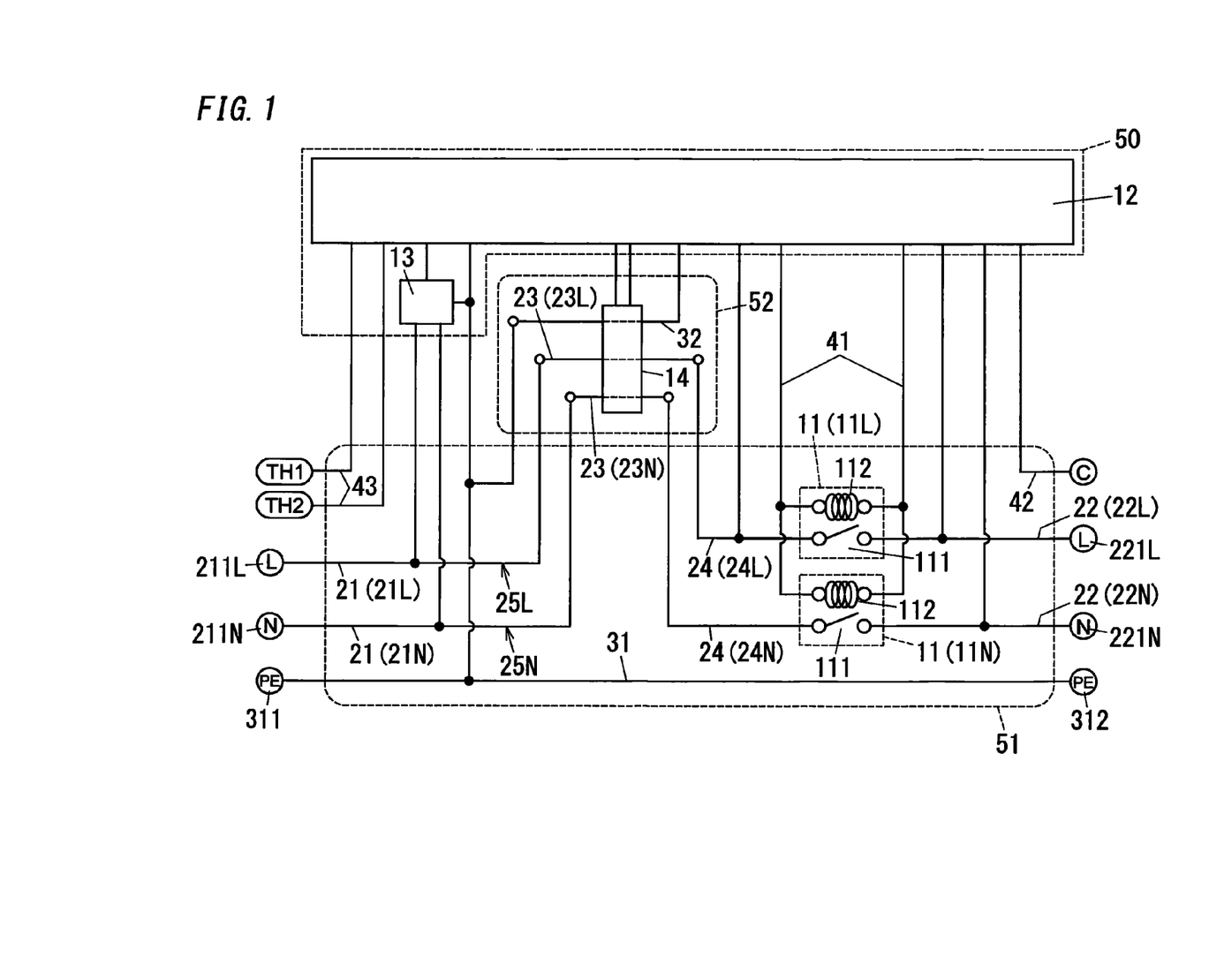
FIG. 1 is a block diagram illustrating a power supply control device of one embodiment in accordance with the present invention.

As shown in FIG. 1, the power supply control device of one embodiment in accordance with the present invention includes a set of power reception conductors (in the present embodiment, a pair of power reception conductors) 21 to be electrically connected to an external power source (not shown) and a set of power supply conductors (in the present embodiment, a pair of power supply conductors) 22 to be electrically connected to a charging circuit of an automobile (not shown) that includes a battery and a charging circuit to charge the battery. The power reception conductors 21 and the power supply conductors 22 are provided one each for line (L) and neutral (N).

In summary, the power supply control device of the present embodiment includes the set of (two) power reception conductors 21 for receiving power, and the set of (two) power supply conductors 22 for supplying power. In the following explanation, a suffix "L" is attached to components regarding the line (L) and a suffix "N" is attached to components regarding the neutral (N), if necessary.

Figure 3:
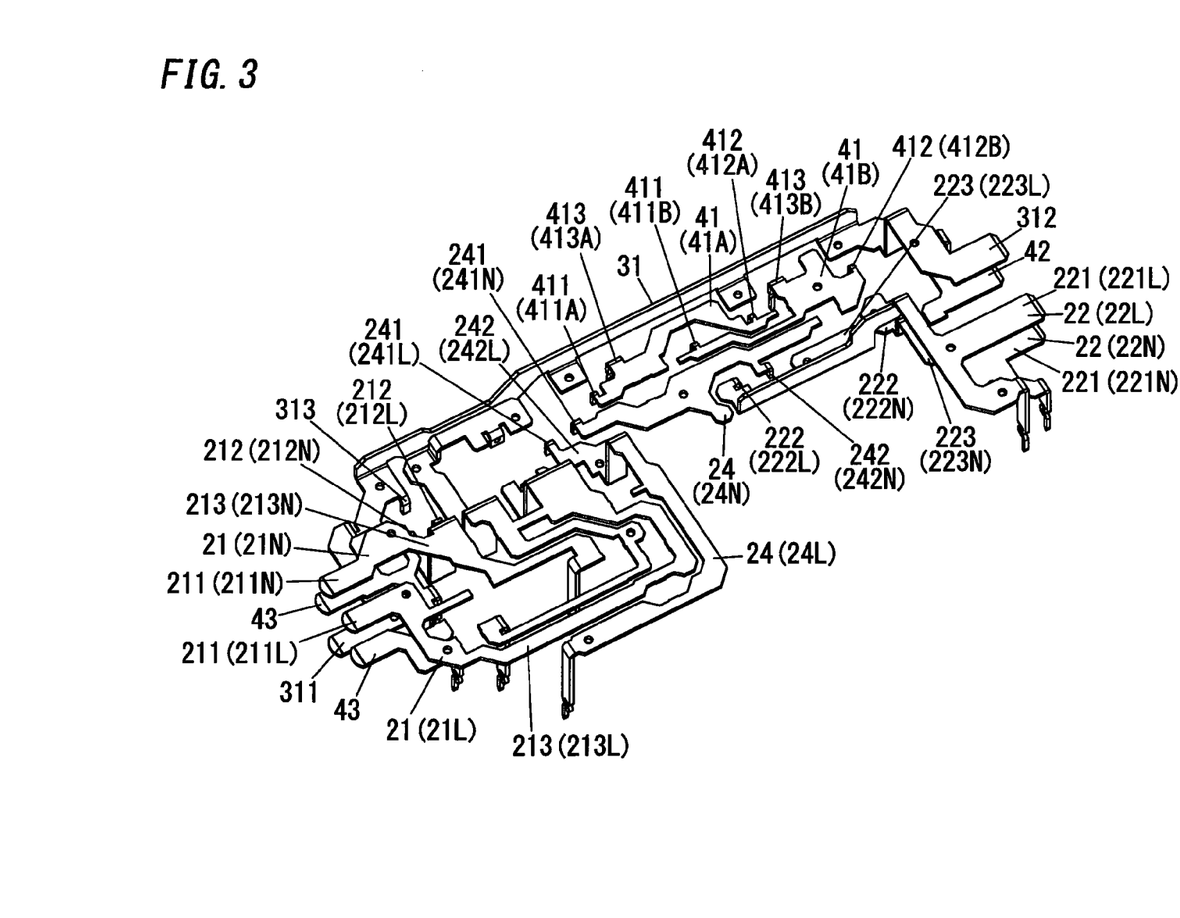
FIG. 3 is a perspective view illustrating conductors to be embedded with insert molding in a first block of the above power supply control device.

As shown in FIG. 3, each of the set of power reception conductors 21 includes a power reception terminal 211, a connection terminal (first connection terminal) 212, and an interconnecting part 213 electrically interconnecting the power reception terminal 211 and the connection terminal 212.

The power reception terminal 211 is used for receiving power. For example, the power reception terminal 211 is to be electrically connected to an external power source. The power reception terminal 211 has a shape allowing mechanical connection with a contact terminal 711 of a predetermined plug (in the present embodiment, a device-side plug 71 of a power supply-side cable 7). The first connection terminal 212 is electrically connected to a corresponding one of the set of power supply conductors 22.

As shown in FIG. 3, each of the set of power supply conductors 22 includes a power supply terminal 221, a connection terminal (second connection terminal) 222, and an interconnecting part 223 electrically interconnecting the power supply terminal 221 and the connection terminal 222.

The power supply terminal 221 is used for supplying power. For example, the power supply terminal 221 is to be electrically connected to a charging circuit for charging a battery of an automobile. The power supply terminal 221 has a shape allowing mechanical connection with a contact terminal 811 of a predetermined plug (in the present embodiment, a device-side plug 81 of a load-side cable 8). The second connection terminal 222 is electrically connected to a corresponding one of the set of power reception conductors 21.

Moreover, the power supply control device of the present embodiment includes relays 11, one for each polarity that open and close respective electrical connections between the power reception conductors 21 and the power supply conductors 22. In brief, the power supply control device of the present embodiment includes a set of relays (in the present embodiment, a pair of relays) 11. The set of (two) relays 11 11 make and break the electrical connections between the power reception terminals 211 and the power supply terminals 221, respectively. For example, each of the relays 11 is constituted by known electromagnetic relays.

Furthermore, the power supply control device of the present embodiment includes a control circuit 12 configured to control the relays 11 and a power circuit 13 configured to generate operating power for the control circuit 12. The control circuit 12 and the power circuit 13 are mounted on the same printed wiring board 50 (see FIG. 2).

The power circuit 13 receives power from the external power source via the power reception conductors 21 and generates power for the control circuit 12. The power supply circuit 13 is configured to supply power to the control circuit 12 by use of power received via the power reception terminal 211. For example, the power circuit 13 converts electrical power supplied by the external power source (100V AC power, for example) to electrical power that is suitable for the operation of the control circuit 12 (DC power of predetermined voltage, for example), and supplies the power to the control circuit 12. This kind of power circuit 13 can be realized by a known AC-DC converter, for example.

The control circuit 12 is electrically connected to control terminals (that is, the terminals of electromagnet devices 112 that drive contact devices 111 of the relays 11) of the relays 11 via a pair of conductors (hereinafter referred to as "driving conductor") 41 (41A and 41B). The control circuit 12 drives (controls) the relays 11 with electrical signals input to the relays 11 via the driving conductors 41.

The conductors 41 (41A and 41B) includes first terminals 411 (411A and 411B), second terminals 412 (412A and 412B), and third terminals 413 (413A and 413B), respectively.

Figure 4:
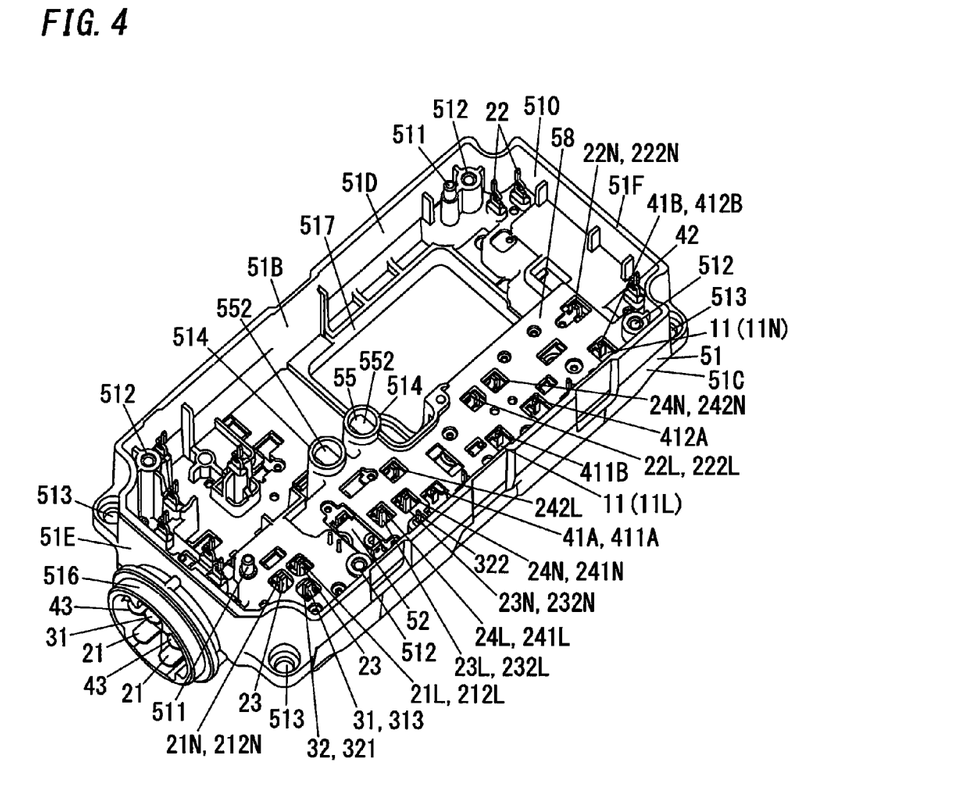
FIG. 4 is a perspective view illustrating a state in which a printed wiring board is detached from the primary part.

As shown in FIG. 4, the electromagnet device 112 of the relay 11L is connected between the first terminals 411A and 411B. The electromagnet device 112 of the relay 11N is connected between the second terminals 412A and 412B.

Note that, the third terminals 413A and 413B are connected to the control circuit 12.

Moreover, the power supply control device of the present embodiment includes a first grounding conductor 31 used as protective earth (PE).

As shown in FIG. 3, the first grounding conductor includes a first grounding terminal 311 for receiving power, a second grounding terminal 312 for supplying power, and a third grounding terminal 313 for detection of an electrical leakage.

The control circuit 12 and the power circuit 13 are electrically connected to the first grounding conductor 31.

Furthermore, the power supply control device of the present embodiment includes a conductor (also designated by "C" in FIG. 1, hereinafter referred to as "first signal conductor") 42 that is to be electrically connected to the charging circuit.

The control circuit 12 controls the relays 11 according to an electrical signal (so-called CPLT signal) that is input via the first signal conductor 42.

Moreover, the power supply control device of the present embodiment includes a pair of conductors (also designated by "TH1" and "TH2" in FIG. 1, hereinafter referred to as "second signal conductors") 43 to receive an output of a thermistor (not shown) provided to an external power source.

The control circuit 12 turns off the relays 11 when receiving a signal indicative of an abnormally high temperature via the second signal conductors 43.

Figure 2:
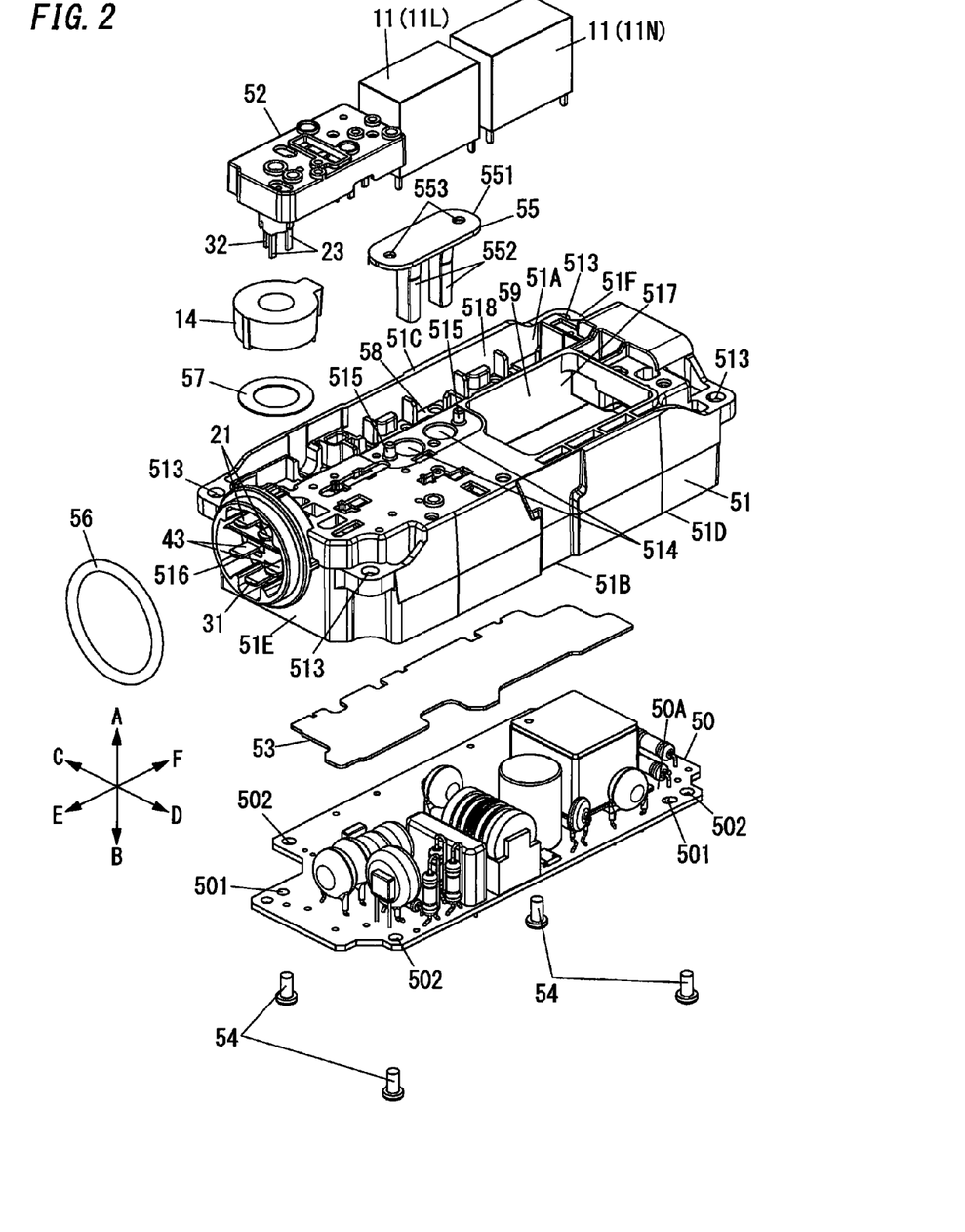
FIG. 2 is an exploded perspective view illustrating a primary part of the above power supply control device.

The conductors 21, 22, 31, 41, 42, and 43 are made of a metal plate as shown in FIG. 3, and, as shown in FIGS. 2 and 4, are held by (fixed to) a block (first block) 51 made of synthetic resin with insert molding.

For example, each of the set of power reception conductors 21 is embedded in the first block 51 such that the power reception terminal 211 and the first connection terminal 212 are exposed. Each of the set of power supply conductors 22 is embedded in the first block 51 such that the power supply terminal 221 and the second connection terminal 222 are exposed. The first grounding conductor 31 is embedded in the first block 51 such that the first grounding terminal 311, the second grounding terminal 312, and the third grounding terminal 313 are exposed.

The relays 11 and the printed wiring board 50 are fixed to the first block 51. The printed wiring board 50 is positioned such that a mounted surface 50A thereof faces the first block 51, and an insulation sheet 53 made of an insulating material such as synthetic resin is inserted between the printed wiring board 50 and the first block 51. The mounting surface 50A is defined by a surface on which the control circuit 12 and the power supply circuit 13 (electronic components of the control circuit 12 and the power supply circuit 13) are mounted.

Hereinafter, A, B, C, D, E, and F directions in FIG. 2 are referred to as upward, downward, left, right, forward, and rearward directions of the power supply control device, respectively. That is, the printed wiring board 50 is attached to a lower side of the first block 51 with the mounted surface 50A being oriented in the upward direction.

When viewed in an upward and downward direction, a whole of the first block 51 has a rectangular shape with a lengthwise direction extending along a forward and rearward direction. For example, the first block 51 has a rectangular frame shape. The first block 51 includes a first side wall 51E and a second side wall 51F facing each other in a first direction (lengthwise direction, which is identical to a direction parallel to the E and F directions in FIG. 2) and a third side wall 51D and a fourth side wall 51C facing each other in a second direction (width direction, which is identical to a direction parallel to the C and D directions in FIG. 2) perpendicular to the first direction. Further, the first block 51 includes a first open end 51A and a second open end 51B respectively defining opposite ends in a third direction (thickness direction, which is identical to a direction parallel to the A and B directions in FIG. 2) perpendicular to each of the first direction and the second direction.

In summary, the first block 51 has the first side wall (first end) 51E and the second side wall (second end) 51F respectively defining the opposite ends in the first direction (lengthwise direction, which is identical to a direction parallel to the E and F directions in FIG. 2), and the third side wall (third end) 51D and the fourth side wall (fourth end) 51C respectively defining the opposite ends in the second direction (width direction, which is identical to a direction parallel to the C and D directions in FIG. 2). Further, the first block has the first open end (fifth end) 51A and the second open end (sixth end) 51B respectively defining the opposite ends in the third direction (thickness direction, which is identical to a direction parallel to the A and B directions in FIG. 2).

Figure 5:
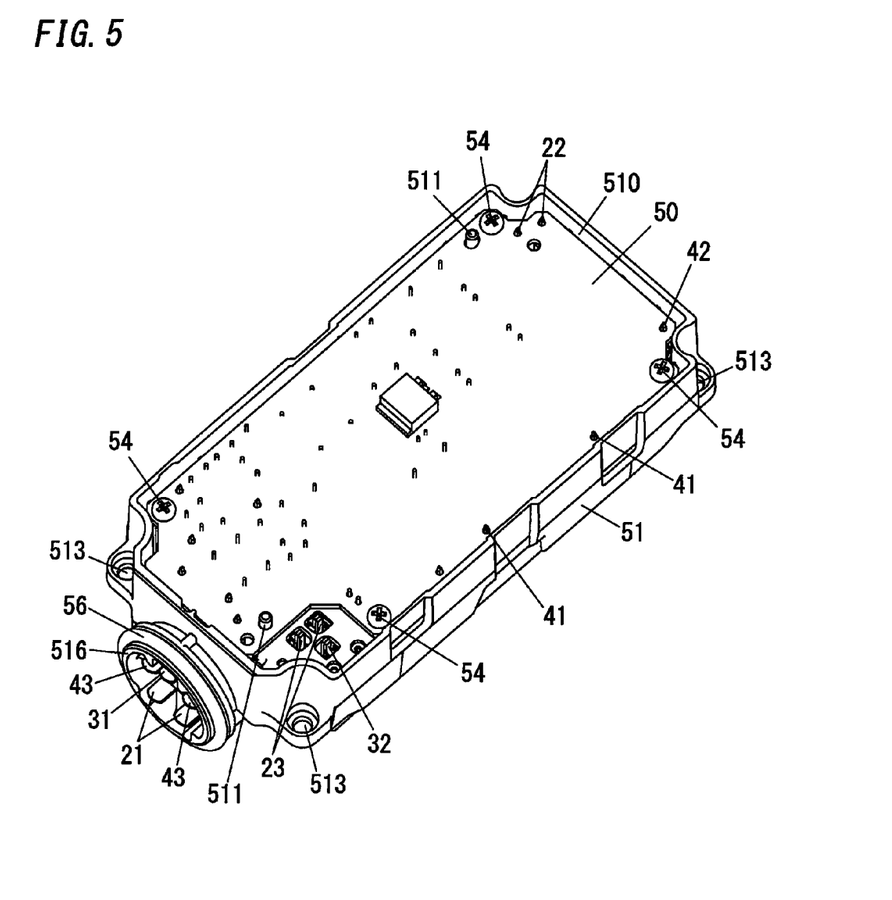
FIG. 5 is a perspective view illustrating the primary part.

As shown in FIGS. 4 and 5, the first block 51 is provided in a lower surface thereof with a housing recess 510 for accommodating the printed wiring board 50.

Provided on an inner bottom surface of the housing recess 510 are a plurality of (two, in the drawings) positioning protrusions 511. The printed wiring board 50 is positioned by inserting the positioning protrusions 511 into respective positioning holes 501 of the printed wiring board 50.

Further, provided near four corners of the inner bottom surface of the housing recess 510 are screw receiving portions 512 each formed into a cylindrical shape and including a screw hole opening downward (upward in FIG. 4).

The printed wiring board 50 is fixed to the first block 51 by screwing four screws 54 into the screw receiving portions 512 via screw passing holes 502 of the printed wiring board 50 respectively.

Furthermore, on the printed wiring board 50, two light-emitting diodes (not shown) are mounted side by side in the forward and rearward direction. The two light-emitting diodes are controlled by the control circuit 12 and used for displaying the conduction state and announcing abnormality.

The control circuit 12 announces abnormality (specifically, contact welding at relay 11) by lighting one of the light-emitting diodes, upon detecting conduction in any of the relays 11 even though the relays 11 are controlled to be turned off.

The first block 51 has two window holes 514 that allow passage of light from the light-emitting diodes one-by-one.

Further, the power supply control device of the present embodiment includes a light guide 55 that is made of a light transmissive (transparent or translucent) material (such as acrylic resin) and guides light from the light-emitting diodes.

The light guide 55 includes a main body portion 551 and leg portions 552. The main body portion 551 has a shape that is long in the forward and rearward direction and flat in the upward and downward direction, and the main body portion 551 is placed on an upper side of the first block 51. The leg portions 552 are protruding downward from the main body portion 551 and are to be inserted in the window holes 514 of the first block 51, respectively.

Furthermore, on an upper surface of the first block 51, swage protrusions 515 that protrude upward are provided at positions between which the two window holes 514 are positioned in the forward and rearward direction.

The light guide 55 is provided in respective opposite ends in the forward and rearward direction with swage holes 553. The light guide 55 is fixed to the first block 51 by inserting the swage protrusions 515 into the respective swage holes 553 and then swaging the swage protrusions 515.

Moreover, the power supply control device of the present embodiment includes a zero-phase current transformer 14 that is stuck on the upper surface of the first block 51 with double-sided tape 57 (see FIG. 2).

Furthermore, the power supply control device of the present embodiment includes a set of intermediate conductors (in the present embodiment, a pair of intermediate conductors) 23 and a second grounding conductor 32. The pair of intermediate conductors 23 are in physical and electrical contact with the respective power reception conductors 21. The second grounding conductor 32 is in physical and electrical contact with the first grounding conductor 31.

Each of the set of (two) intermediate conductors 23 includes a connection terminal (third connection terminal) 231 and a connection terminal (fourth connection terminal) 232. The third connection terminals 231 of the set of intermediate conductors 23 are electrically connected to the first connection terminals 212 of the set of power reception conductors 21, respectively. The set of relays 11 (contact devices 111) are interposed between the fourth connection terminals 232 of the set of intermediate conductors 23 and the second connection terminals 222 of the set of power supply conductors 22, respectively.

The second grounding conductor 32 includes a fourth grounding terminal 321 and a fifth grounding terminal 322. The fourth grounding terminal 321 is electrically connected to the third grounding terminal 313 of the first grounding conductor 31. The fifth grounding terminal 322 is electrically connected to the control circuit 12.

Figure 6:
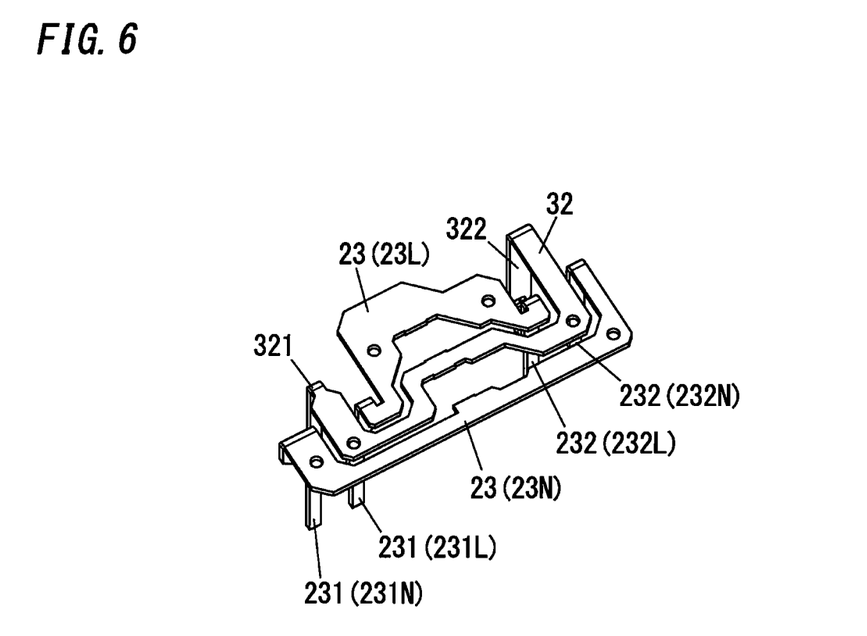
FIG. 6 is a perspective view illustrating conductors to be embedded with insert molding in a second block of the above power supply control device.

As shown in FIG. 6, each of the intermediate conductors 23 and the second grounding conductor 32 is made of a belt-shaped metal plate, and has a U shape as a whole in which a center portion thereof is turned such that a thickness direction thereof is identical to the upward and rearward direction and both ends thereof are bent downward.

The intermediate conductors 23 and the second grounding conductor 32 are embedded in the second block 52 of synthetic resin by insert molding so as to be securely insulated from each other and integrated.

For example, each of the set of intermediate conductors 23 is embedded in the second block 52 such that the third connection terminal 231 and the fourth connection terminal 232 are exposed. The second grounding conductor 32 is embedded in the second block 52 such that the fourth grounding terminal 321 and the fifth grounding terminal 322 are exposed.

The second block 52 is connected to the first block 51 by engaging the second block 52 and the first block 51 with each other, for example, such that the zero-phase current transformer 14 is between the first block 51 and the second block 52. In the power supply control device of the present embodiment, the first block 51 and the second block 52 constitute a body block 5.

The zero-phase current transformer 14 positioned between the first block 51 and the second block 52 to allow the set of intermediate conductors 23 to pass through an inside of the zero-phase current transformer 14. Further, the second grounding conductor 32 is positioned to pass through the inside of the zero-phase current transformer 14.

Moreover, a set of connection conductors (in the present embodiment, two connection conductors) 24 made of a metal plate are fixed to the first block 51 by insert molding. Each of the connection conductors 24 has one end to be electrically connected to the contact of corresponding one of the relays 11 and the other end to be in physical and electrical contact with corresponding one of the intermediate conductors 23.

Each of the set of connection conductors 24 includes a connection terminal (fifth connection terminal) 241 and a connection terminal (sixth connection terminal) 242. Each of the set of connection conductors 24 is embedded in the first block 51 such that the fifth connection terminal 241 and the sixth connection terminal 242 are exposed. The fourth connection terminals 232 of the set of intermediate conductors 23 are electrically connected to the fifth connection terminals 241 of the set of connection conductors 24, respectively. The set of relays 11 (the contact devices 111 of the set of relays Ware interposed between the sixth connection terminals 242 of the set of connection conductors 24 and the second connection terminals 222 of the set of power supply conductors 22, respectively.

That is, the power reception conductors 21 are each electrically connected to one power supply conductor 22 via one intermediate conductor 23, one connection conductor 24, and one relay 11.

In summary, in the power supply control device of the present embodiment, the interconnecting part 213L, the first connection terminal 212L, the intermediate conductor 23L, the connection conductor 24L, the relay 11L (the contact device 111 of the relay 11L), the second connection terminal 222L, and the interconnecting part 223L constitute an electrical circuit 25 (25L) electrically connecting the power reception terminal 211L and the power supply terminal 221L. The interconnecting part 213N, the first connection terminal 212N, the intermediate conductor 23N, the connection conductor 24N, the relay 11N (the contact device 111 of the relay 11N), the second connection terminal 222N, and the interconnecting part 223N constitute an electrical circuit 25 (25N) electrically connecting the power reception terminal 211N and the power supply terminal 221N.

The electrical connection between the power reception conductor 21 and the power supply conductor 22 is opened and closed depending on opening and closing of the electrical connection between the connection conductor 24 and the power supply conductor 22 by the relay 11. In brief, the relay 11 is configured to make and break the electrical connection between the power reception terminal 211 and the power supply terminal 221 by opening and closing the electrical circuit 25.

In the power supply control device of the present embodiment, the first block 51 holds the power reception terminals 211, the power supply terminals 221, the relays 11, the printed wiring board 50, and the electrical circuit 25.

As shown in FIG. 2, the power reception terminal 211 and the power supply terminal 221 are positioned at the first side wall (first end, which is identical to the front end in FIG. 2) 51E and the second side wall (second end, which is identical to the rear end) 51F, respectively. Especially, the power reception terminal 211 and the power supply terminal 221 are positioned on a straight line extending in the first direction (lengthwise direction of the first block 51, which is identical to a direction parallel to the E and F directions in FIG. 2).

As shown in FIGS. 3 and 4, each electrical circuit 25 is positioned closer to the third end (third side wall) 51D than the fourth end (fourth side wall) 51C such that a circuit accommodating space 517 is formed closer to the third end (third side wall) 51D than the fourth end (fourth side wall) 51C.

For example, each power reception conductor 21 is formed such that the power reception terminal 211 is positioned at the first side wall 51E and the first connection terminal 212 is positioned closer to the fourth side wall 51C than the third side wall 51D. Each power supply conductor 22 is formed such that the power supply terminal 221 is positioned at the second side wall 51F and the second connection terminal 222 is positioned closer to the fourth side wall 51C than the third side wall 51D. The first grounding conductor 31 is formed such that the first grounding terminal 311 and the second grounding terminal 312 are positioned at the first side wall 51E and the second side wall 51F respectively and a part interconnecting the first grounding terminal 311 and the second grounding terminal 312 is positioned closer to the fourth side wall 51C than the third side wall 51D. Each intermediate conductor 23, each connection conductor 24, and the second grounding conductor 32 are positioned closer to the fourth side wall 51C than the third side wall 51D. Accordingly, the circuit accommodating space 517 is formed closer to the third end (third side wall) 51D than the fourth end (fourth side wall) 51C.

The circuit accommodating space 517 is defined as a space for accommodating the control circuit 12 and the power supply circuit 13 (the electronic components of the control circuit 12 and the power supply circuit 13). The printed wiring board 50 is positioned closer to the sixth end (second open end) 51B than the fifth end (first open end) 51A such that the mounting surface 50A faces the fifth end (first open end) 51A. Accordingly, the control circuit 12 and the power supply circuit 13 are in the circuit accommodating space 517.

As shown in FIG. 2, the first block 51 includes a relay accommodating space 518 in which the relays 11 are positioned. The relay accommodating space 518 is positioned closer to the fourth end (fourth side wall) 51C than the third end (third side wall) 51D. In the power supply control device of the present embodiment, the set of relays 11 are accommodated in the relay accommodating space 518 to be arranged side by side in the lengthwise direction of the first block 51.

Further, as shown in FIGS. 2 and 3, the first block 51 includes a supporting member 58 supporting the relays 11. The supporting member 58 has a flat plate shape, for example. The supporting member 58 is positioned closer to the sixth end (second open end) 51B than the fifth end (first open end) 51A and defines a bottom of the relay accommodating space 518. The power supply conductor 22 and the connection conductor 24 which are part of the electrical circuit 25 are embedded in the supporting member 58 partially. In brief, at least one part of each electrical circuit 25 is embedded in the supporting member 58.

Furthermore, as shown in FIGS. 2 and 3, the first block 51 includes a partition 59. The partition 59 is interposed between the circuit accommodating space 517 and the relay accommodating space 518. In brief, the partition 59 divides an internal space of the first block 51 into the circuit accommodating space 517 and the relay accommodating space 518. For example, the partition 59 has a flat plate shape. The circuit accommodating space 517 is defined as a space enclosing by the first side wall 51E, the second side wall 51F, the third side wall 51D, and the partition 59. The relay accommodating space 518 is defined as a space enclosing by the first side wall 51E, the second side wall 51F, the fourth side wall 51C, and the partition 59.

The zero-phase current transformer 14 has a ring shape and is oriented such that an axial direction thereof is identical to the upward and downward direction. The intermediate conductors 23 and the second grounding conductor 32 are inserted in the zero-phase current transformer 14. In a state in which an electric leakage has not occurred, since magnetic fields generated by the respective intermediate conductors 23 cancel each other, an induction current is not generated in the zero-phase current transformer 14. When an electric leakage occurs, the two magnetic fields fail to cancel each other and thus an induction current is generated in the zero-phase current transformer 14.

The control circuit 12 determines whether or not an electric leakage has occurred based on the induction current, and turns off the relays 11 upon determining that an electric leakage has occurred (that is, when the electric leakage has been detected). In brief, the control circuit 12 is configured to, upon detecting an electrical leakage by the zero-phase current transformer 14, control the set of relays 11 to break the electrical connections between the set of intermediate conductors 23 and the set of power supply conductors 22.

Moreover, as shown in FIG. 1, the control circuit 12 is electrically connected to one of the connection conductors 24 so as to enable performing an operation test of the zero-phase current transformer 14 by applying a current for simulating the electric leakage.

As shown in FIGS. 7 to 10, the power supply control device of the present embodiment includes a housing 6 configured to accommodate the first block 51 to which the printed wiring board 50, the relays 11, the zero-phase current transformer 14, the second block 52, and the light guide 55 are attached.

Figure 7:
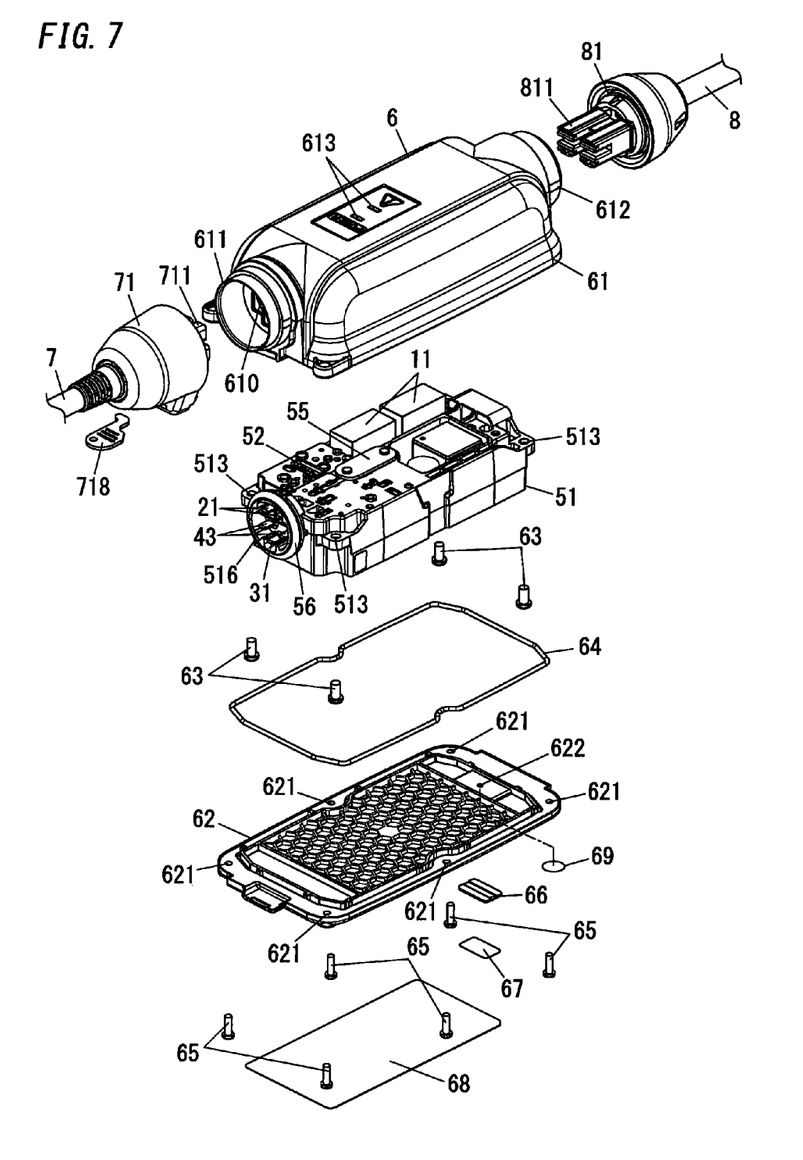
FIG. 7 is an exploded perspective view illustrating the above power supply control device.
Figure 8:
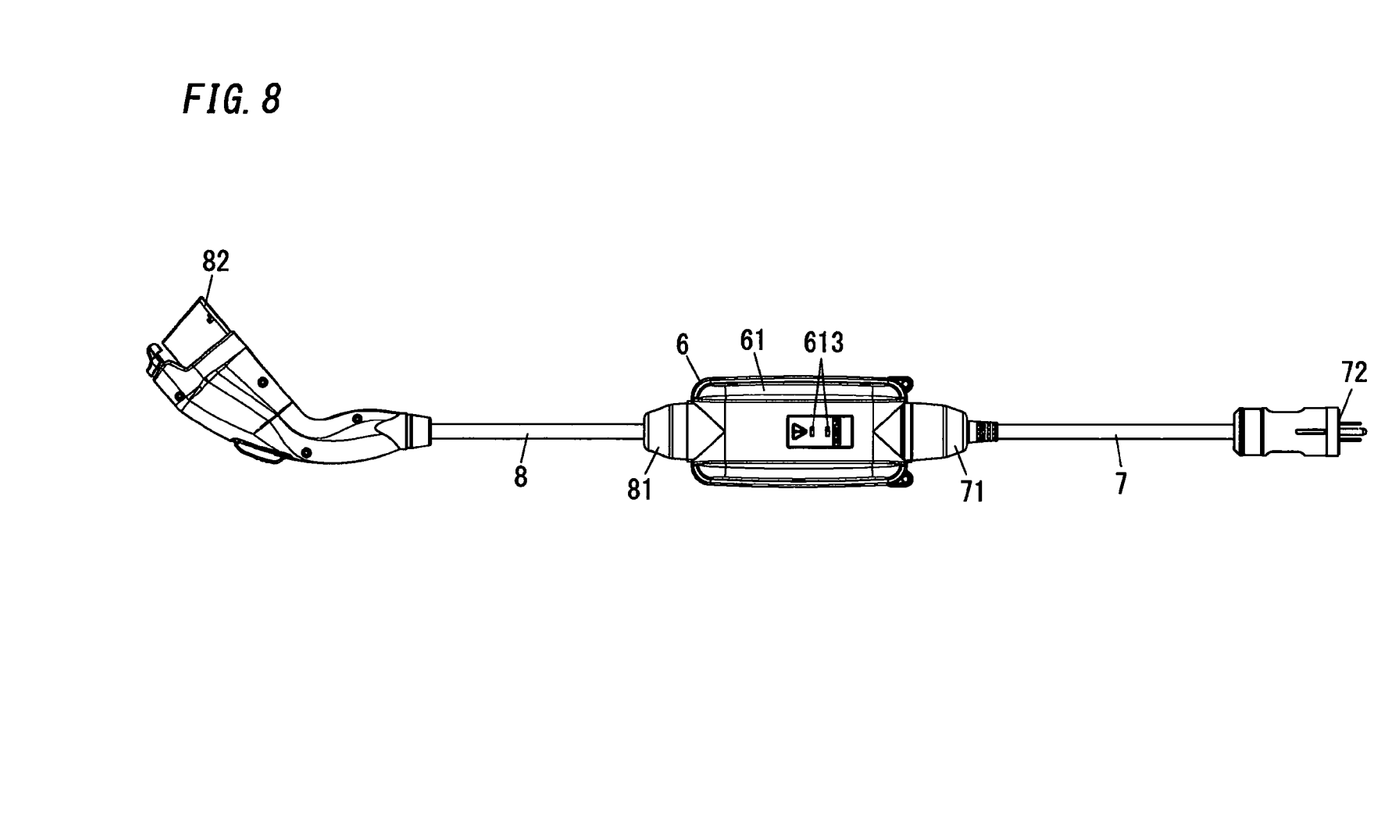
FIG. 8 is a plan view illustrating the above power supply control device.
Figure 9:
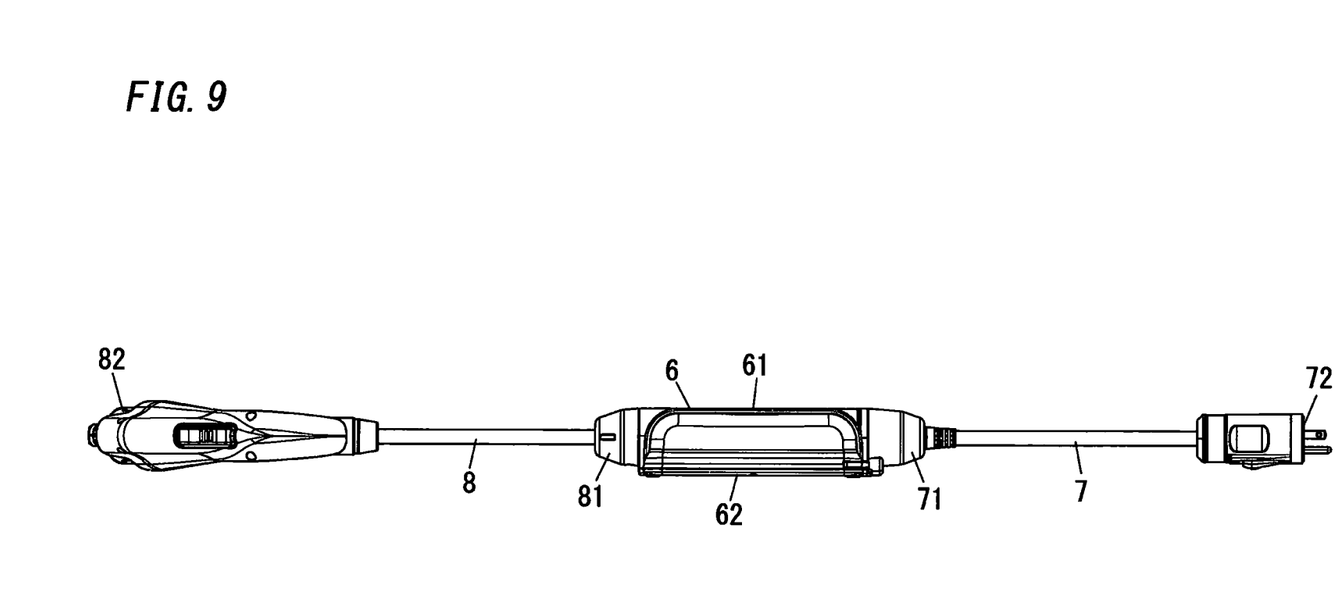
FIG. 9 is a front view illustrating the above power supply control device.
Figure 10:
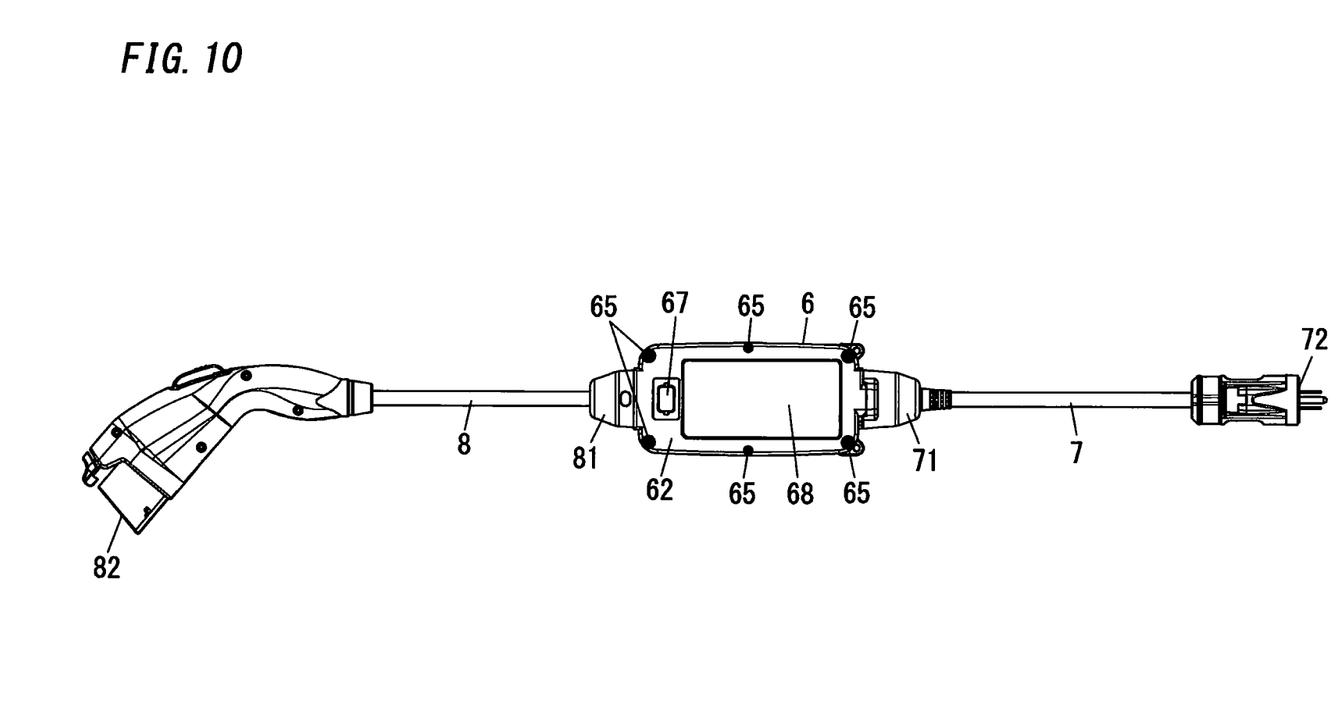
FIG. 10 is a bottom view illustrating the above power supply control device.

The housing 6 includes a body 61 and a cover 62. The body 61 is provided in a lower surface with a housing recess 610 for accommodating the first block 51. The cover 62 is coupled to a lower side of the body 61 to cover the housing recess 610.

The body 61 is provided at respective two portions positioned above the leg portions 552 of the light guide 55 with two display windows 613 allowing passage of light from the light emitting diodes. The display windows 613 are through holes filled with light transmissive resin, for example.

The first block 51 is provided in respective four corners when viewed in the upward and downward direction with screw insertion holes 513. Each of the screw insertion holes 513 has a ring-shape and allows insertion of screws 63 for fixing the first block 51 to the body 61 by screwing.

The first block 51 is fixed to the housing 6 (body 61). In contrast, the second block 52 is fixed to the opposite surface of the first block 51 from the cover 62. Consequently, the second block 52 is fixed to the first block 51 but is not fixed to the housing 6 directly. Besides, a method of fixing the first block 51 to the housing 6 is not limited to screwing.

Further, interposed between a lower periphery of the housing recess 610 of the body 61 and the cover 62 is a packing 64 that has a ring-shape and is made of a soft material such as elastomer.

Fixing the cover 62 to the body 61 is achieved by screwing six screws 65 into the body 61 via respective screw insertion holes 621 of the cover 62.

Also, the cover 62 includes a ventilation hole 622 that communicates to the housing recess 610 of the body 61.

Moreover, stuck to a lower surface of the cover 62 are an inner pressure adjusting sheet 69 covering the ventilation hole 622 and an inner pressure adjusting sheet cover 66 covering the inner pressure adjusting sheet 69. The inner pressure adjusting sheet 69 is made of a known porous material and ensures waterproofness and dust proofness along with breathability.

Further, stuck to the lower surface of the cover 62 are labels 67 and 68 describing various kinds of information.

The body 61 is provided at the front end thereof with a power supply connection portion 611 that has a cylinder-shape and connects an inside and an outside of the housing recess 610 of the body 61. Also, the body 61 is provided at a rear end thereof with a load connection portion 612 that has a cylinder-shape and connects the inside and the outside of the housing recess 610 of the body 61.

Each of the power reception conductors 21, the first grounding conductor 31, and the second signal conductors 43 has a front end portion, which is exposed inside the power supply connection portion 611 while a thickness direction thereof is identical to the upward and downward direction.

The first block 51 is provided at a front end (first side wall) 51E thereof with a protrusion 516 that has a ring-shape and is inserted in the power supply connection portion 611. Interposed between an outer periphery of this protrusion 516 and an inner surface of the body 61 is an O-ring 56 made of a soft material such as elastomer.

Besides, an electrical connection between the power supply control device of the present embodiment and the external power source is made via a power supply-side cable 7. The power supply-side cable 7 is provided at one end with a device-side plug 71 to be fitted into the power supply connection portion 611, and is provided at the other end with a power supply-side plug 72 to be inserted in and connected to an outlet (not shown) of the external power source.

The device-side plug 71 of the power supply-side cable 7 includes five contact terminals 711 that are kept in physical and electrical contact with the power reception conductors 21, the first grounding conductor 31, and the second signal conductors 43, respectively, while the device-side plug 71 is fitted into the power supply connection portion 611.

Each of the contact terminals 711 is clip-shaped metal plate and has portions for elastically holding corresponding one of the conductors 21, 31, and 43 therebetween in the thickness direction, for example.

The power supply-side cable 7 has electric wires (not shown) which include a line electric wire and a neutral electric wire to be electrically connected to the power reception conductors 21 via the contact terminals 711 respectively.

The device-side plug 71 of the power supply-side cable 7 is provided with a latch mechanism (not shown) that prevents separation thereof from the housing 6. In FIG. 7, a release key 718 for releasing the latching by the latch mechanism is depicted.

Each of the power supply conductors 22, the first grounding conductor 31, and the first signal conductor 42 has a rear end portion, which is exposed inside the load connection portion 612 while a thickness direction thereof is identical to the upward and downward direction.

Further, an electrical connection between the power supply control device of the present embodiment and the charging circuit of an automobile is achieved via a load-side cable 8. The load-side cable 8 is provided at one end with a device-side plug 81 to be fitted in the load connection portion 612, and is provided at the other end with a load-side plug 82 to be inserted in and connected to a socket (not shown) of the automobile.

The device-side plug 81 of the load-side cable 8 includes the four contact terminals 811 that are kept in physical and electrical contact with the power supply conductors 22, the first grounding conductor 31, and the first signal conductor 42, respectively, while the device-side plug 81 is fitted into the load connection portion 612.

Each of the contact terminals 811 is a clip-shaped metal plate, and has portions for elastically holding corresponding one of the conductors 22, 31, and 42 therebetween in the thickness direction, for example.

The load-side cable 8 has electric wires (not shown) including a line electric wire and a neutral electric wire to be electrically connected to the power supply conductors 22 via the contact terminals 811, respectively.

As described above, the power supply control device of the present embodiment includes: the power reception conductor 21 to be electrically connected to an external power source; the power supply conductor 22 to be electrically connected to a charging circuit of an automobile including a battery and the charging circuit for charging the battery; the relay 11 configured to make and break the electrical connection between the power reception conductor 21 and the power supply conductor 22; the control circuit 12 configured to control the relay 11; the power supply circuit 13 configured to receive power from the external power source via the power reception conductor 21 and generate power for the control circuit 12; and the printed wiring board 50 on which the control circuit 12 and the power circuit 13 are mounted.

In other words, the power supply control device of the present embodiment involves the following first feature.

According to the first feature, the power supply control device includes: the power reception terminal 211 for receiving power; the power supply terminal 221 for supplying power; the relay 11 configured to make and break the electrical connection between the power reception terminal 211 and the power supply terminal 221; the control circuit 12 configured to control the relay 11; the power supply circuit 13 configured to supply power to the control circuit 12 by use of power received via the power reception terminal 211; and the (single) printed wiring board 50. The control circuit 12 and the power supply circuit 13 are mounted on the printed wiring board 50.

Additionally, the power supply control device of the present embodiment involves the following second to ninth features. Note that, the second to ninth features are optional.

According to the second feature, in addition to the first feature, the power supply control device further includes the electrical circuit 25 and the block (first block) 51. The electrical circuit 25 is electrically connecting the power reception terminal 211 and the power supply terminal 221. The block 51 holds the power reception terminal 211, the power supply terminal 221, the relay 11, the printed wiring board 50, and the electrical circuit 25. The relay 11 is configured to make and break the electrical connection between the power reception terminal 211 and the power supply terminal 221 by opening and closing the electrical circuit 25. The block 51 has the first end 51E and the second end 51F respectively defining opposite ends in the first direction (lengthwise direction), and the third end 51D and the fourth end 51C respectively defining opposite ends in the second direction (width direction) perpendicular to the first direction. The power reception terminal 211 and the power supply terminal 221 are positioned at the first end 51E and the second end 51F, respectively. The electrical circuit 25 is positioned closer to the third end 51D than the fourth end 51C such that the circuit accommodating space 517 is formed closer to the third end 51D than the fourth end 51C. The control circuit 12 and the power supply circuit 13 are positioned in the circuit accommodating space 517.

According to the third feature, in addition to the second feature, the block 51 has a fifth end 51A and a sixth end 51B respectively defining opposite ends in the third direction (thickness direction) perpendicular to each of the first direction and the second direction. The printed wiring board 50 has the mounting surface 50A on which the control circuit 12 and the power supply circuit 13 are mounted. The printed wiring board 50 is positioned closer to the sixth end 51B than the fifth end 51A such that the mounting surface 50A faces the fifth end 51A.

According to the fourth feature, in addition to the third feature, the block 51 includes the relay accommodating space 518 in which the relay 11 is positioned. The relay accommodating space 518 is positioned closer to the fourth end 51C than the third end 51D.

According to the fifth feature, in addition to the fourth feature, the block 51 includes the supporting member 58 supporting the relay 11. The supporting member 58 is positioned closer to the sixth end 51B than the fifth end 51A and defines a bottom of the relay accommodating space 518. At least one part of the electrical circuit 25 is embedded in the supporting member 58.

According to the sixth feature, in addition to the fourth or fifth feature, the block 51 includes the partition 59. The partition 59 is interposed between the circuit accommodating space 517 and the relay accommodating space 518.

According to the seventh feature, in addition to the sixth feature, the block 51 includes the first side wall 51E defining the first end, the second side wall 51F defining the second end, the third side wall 51D defining the third end, and the fourth side wall 51C defining the fourth end. The circuit accommodating space 517 is defined as a space enclosing by the first side wall 51E, the second side wall 51F, the third side wall 51D, and the partition 59. The relay accommodating space 518 is defined as a space enclosing by the first side wall 51E, the second side wall 51F, the fourth side wall 51C, and the partition 59.

According to the eighth feature, in addition to any one of the first to seventh features, the power reception terminal 211 and the power supply terminal 221 are positioned on a straight line extending in the first direction.

According to the ninth feature, in addition to any one of the first to eighth features, the power reception terminal 211 is to be electrically connected to an external power source. The power supply terminal 221 is to be electrically connected to a charging circuit for charging a battery of an automobile.

According to the above configuration, the control circuit 12 and the power circuit 13 are mounted on the same printed wiring board 50. Hence, compared with a case where the control circuit 12 and the power circuit 13 are mounted on different printed wiring boards, conductors for connecting the different printed wiring boards are unnecessary and therefore the number of necessary connections is reduced. As a result, poor connection is unlikely to occur.

Also, compared with the case where the control circuit 12 and the power circuit 13 are mounted on different printed wiring boards, the overall length of the electrical path can be shortened and therefore injection of radiation noise can be suppressed.

The invention claimed is:

1. A power supply control device, comprising:
a power reception terminal for receiving power;
a power supply terminal for supplying power;
a relay configured to make and break an electrical connection between the power reception terminal and the power supply terminal;
a control circuit configured to control the relay;
a power supply circuit configured to supply power to the control circuit by use of power received via the power reception terminal;
a printed wiring board;
an electrical circuit electrically connecting the power reception terminal and the power supply terminal; and
a block holding the power reception terminal, the power supply terminal, the relay, the printed wiring board, and the electrical circuit,
wherein:
the control circuit and the power supply circuit are mounted on the printed wiring board;
the relay is configured to make and break the electrical connection between the power reception terminal and the power supply terminal by opening and closing the electrical circuit;
the block has a first end and a second end respectively defining opposite ends in a first direction, and a third end and a fourth end respectively defining opposite ends in a second direction perpendicular to the first direction;
the power reception terminal and the power supply terminal are positioned at the first end and the second end, respectively;
the electrical circuit is positioned closer to the third end than the fourth end such that a circuit accommodating space is formed closer to the third end than the fourth end; and
the control circuit and the power supply circuit are positioned in the circuit accommodating space.

2. The power supply control device according to claim 1, wherein:
the block has a fifth end and a sixth end respectively defining opposite ends in a third direction perpendicular to each of the first direction and the second direction;
the printed wiring board has a mounting surface on which the control circuit and the power supply circuit are mounted; and
the printed wiring board is positioned closer to the sixth end than the fifth end such that the mounting surface faces the fifth end.

3. The power supply control device according to claim 2, wherein:
the block includes a relay accommodating space in which the relay is positioned; and
the relay accommodating space is positioned closer to the fourth end than the third end.

4. The power supply control device according to claim 3, wherein:
the block includes a supporting member supporting the relay;
the supporting member is positioned closer to the sixth end than the fifth end and defines a bottom of the relay accommodating space; and
at least one part of the electrical circuit is embedded in the supporting member.

5. The power supply control device according to claim 3, wherein:
the block includes a partition; and
the partition is interposed between the circuit accommodating space and the relay accommodating space.

6. The power supply control device according to claim 5, wherein:
the block includes a first side wall defining the first end, a second side wall defining the second end, a third side wall defining the third end, and a fourth side wall defining the fourth end;
the circuit accommodating space is defined as a space enclosing by the first side wall, the second side wall, the third side wall, and the partition; and
the relay accommodating space is defined as a space enclosing by the first side wall, the second side wall, the fourth side wall, and the partition.

7. The power supply control device according to claim 1, wherein
the power reception terminal and the power supply terminal are positioned on a straight line extending in the first direction.

8. The power supply control device according to claim 1, wherein:
the power reception terminal is to be electrically connected to an external power source; and
the power supply terminal is to be electrically connected to a charging circuit for charging a battery of an automobile.

* * * * *